Patented Aug. 19, 1947

2,425,723

UNITED STATES PATENT OFFICE 2,425,723

THIOPHENE COMPOUNDS AND METHODS FOR OBTAINING THE SAME

Frederick F. Blicke, Ann Arbor, Mich., assignor to The Regents of the University of Michigan, Ann Arbor, Mich., a body corporate of Michigan No Drawing. Application August 6, 1945, Serial No. 609,336

13 Claims. (Cl. 260—293)

This invention relates to new basic thiophenic esters and methods for obtaining the same, said esters having the general formula for the free base

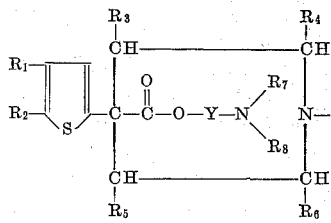

where R represents a member of the class consisting of hydrogen and lower alkyl radicals, $R_1$ represents a member of the class consisting of hydrogen and —$CH_3$, $R_2$ represents a member of the class hydrogen, chlorine, bromine, iodine and lower alkyl radicals, $R_3$, $R_4$, $R_5$, and $R_6$ represent the same or different members of the class consisting of hydrogen and lower alkyl radicals, Y represents a saturated divalent hydrocarbon residue of 2 to 6 carbon atoms, $R_7$ and $R_8$ represent the same or different members of the class consisting of lower alkyl radicals and $R_7$, $R_8$ and N may be taken together to form a saturated heterocyclic ring system such as pyrollidine, piperidine, morpholine and the like.

The thiophene compounds of the present invention, because of their polyfunctional nature, are useful as intermediates for the synthesis of a number of different types of organic compounds. These new compounds are also useful therapeutic agents and in general they are characterized by their analgesic, antispasmodic and sedative effects both in humans and in animals. These new basic thiophenic esters may be administered in the form of their bases or in the form of their acid addition salts with organic or inorganic acids such as hydrochloric acid, hydrobromic acid, hydriodic acid, sulfuric acid, nitric acid, phosphoric acid, acetic acid, sulfamic acid, lactic acid, tartaric acid, gluconic acid, malic acid, maleic acid, benzoic acid, phthalic acid, salicylic acid, succinic acid, fumaric acid, and the like acids.

The new compounds of the invention may be prepared by the reaction of the hydrochloride salt of a thiophenic acyl chloride of the formula,

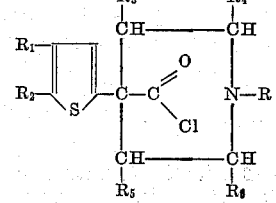

with a basic alcohol of the formula,

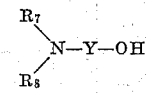

whereby the desired basic thiophenic ester is obtained, said ester having the formula,

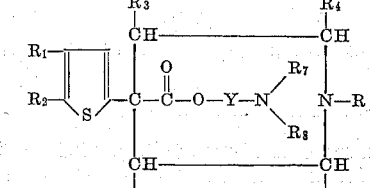

In the above formulas the R groups and Y have the same significance as given above.

The reaction of the thiophenic acyl chloride hydrochlorides with the various basic alcohols,

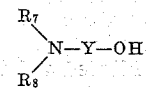

may be carried out in a dry inert organic solvent such as benzene, toluene, xylene, petroleum ether, chloroform and the like, but I prefer to carry out this reaction using an excess of the basic alcohol,

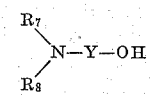

as the solvent.

Some of the basic alcohols,

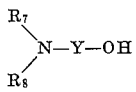

used in accordance with the present invention to react with the thiophenic acyl chlorides are commercially available while the others may be prepared by known methods. For example, these basic alcohols may be prepared by the reaction of the appropriate alkylene oxides or alkyl halohydrins with a secondary amine.

The thiophenic acyl chlorides hydrochlorides, used as starting materials, may be prepared, for example, as described in my copending application No. 609,335, filed August 6, 1945.

The invention is illustrated by the following examples.

*Example 1.—β-Dimethylaminoethyl ester of 2-[4'-(1'-methyl-4'-carboxypiperidyl)] thiophene*

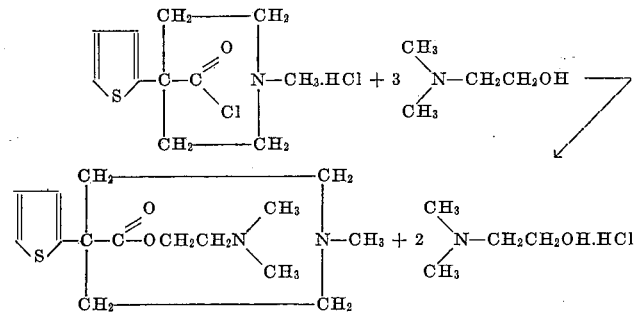

A mixture consisting of 15 g. of the acid chloride hydrochloride of 2-[4'-(1'-methyl-4'-carboxypiperidyl)] thiophene (prepared, for example, as described in Example 1 of my copending application No. 609,335, filed August 6, 1945), and 25 ml. of β-dimethylaminoethanol is heated on a steam bath for two hours. The excess amino alcohol is removed by distillation under reduced pressure and the residue taken up in 75 ml. of water. The mixture is acidified with dilute hydrochloric acid, filtered and the filtrate treated with charcoal. The mixture is filtered and excess 5% sodium hydroxide added to the filtrate. The precipitated ester is extracted with ether, the ether extracts dried over anhydrous magnesium sulfate, the ether distilled and the residue fractionated under reduced pressure. The pure β-dimethylaminoethyl ester of 2-[4'-(1'-methyl-4'-carboxypiperidyl)] thiophene is obtained as a very light colored oil boiling about 210° C. at 11 mm. of mercury.

The ester is dissolved in anhydrous ether and the solution treated with an excess of dry hydrogen chloride. The dihydrochloride which precipitates as a slightly gummy solid is dissolved in hot isobutyl alcohol and ether added to the solution until the salt begins to separate. The mixture is cooled and the crystalline dihydrochloride of the β-dimethylaminoethyl ester of 2-[4'-(1'-methyl-4'-carboxypiperidyl)] thiophene collected and dried in vacuo.

*Example 2.—β-Diethylaminoethyl ester of 2-[4'-(1'-methyl-4'-carboxypiperidyl)] thiophene*

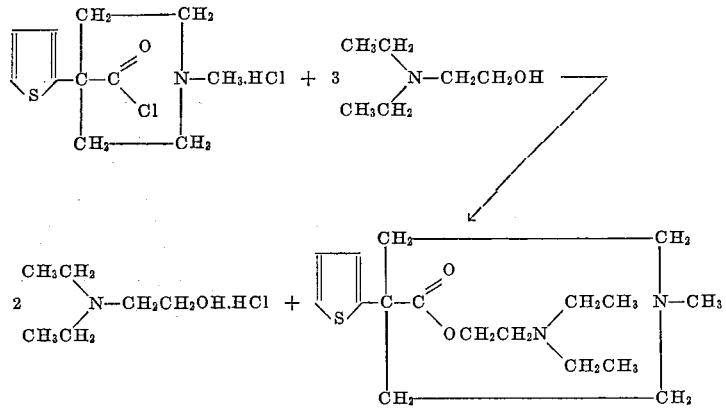

A mixture consisting of 15 g. of the acid chloride hydrochloride of 2-[4'-(1'-methyl-4'-carboxypiperidyl)] thiophene (prepared as described in Example 1) and 25 ml. of β-diethylaminoethanol is heated on a steam bath for two hours. The excess amino alcohol is removed by distillation under reduced pressure and the residue treated with 75 ml. of water. The mixture is acidified with dilute hydrochloric acid, treated with charcoal and filtered. The filtrate is made alkaline by the addition of excess 5% sodium hydroxide solution, the precipitated ester extracted with ether and the ether extracts dried over anhydrous magnesium sulfate. The drying agent is removed by filtration and the ether distilled from the filtrate. The residue is distilled under reduced pressure to yield the pure β-diethylaminoethyl ester of 2-[4'-(1'-methyl-4'-carboxypiperidyl)] thiophene; B. P. 215-18° C./11 mm.

10 g. of the pure ester is dissolved in 200 ml. of dry ether and the resulting solution treated with an excess of dry hydrogen chloride. The dihydrochloride salt which separates as a slightly gummy solid is collected, washed with dry ether and recrystallized twice from iso-butanol-ether mixture. After drying in vacuo for several hours the analytically pure dihydrochloride salt of the β-diethylaminoethyl ester of 2-

[4' - (1' - methyl-4'-carboxypiperidyl) thiophene melts at 154–55° C.

The dihydrobromide salt of the ester is prepared by treating a dry ether solution of the ester with dry hydrogen bromide. The white precipitated salt is collected, washed with dry ether and purified by recrystallization from isobutanol ether mixture.

*Example 3.—β-Pyrrolidinoethyl ester of 2-[4'-(1'-methyl-4'-carboxypiperidyl)] thiophene*

A mixture consisting of 15 g. of the acid chloride hydrochloride of 2-[4'-(1'-methyl-4'-carboxypiperidyl)] thiophene (prepared as described in Example 1) and 30 ml. of β-piperidinoethanol is heated on a steam bath for about two hours. The excess amino alcohol is removed by distillation under reduced pressure, the residue treated with 75 ml. of water and the mixture acidified with dilute hydrochloric acid. The solution is treated with charcoal, filtered and the

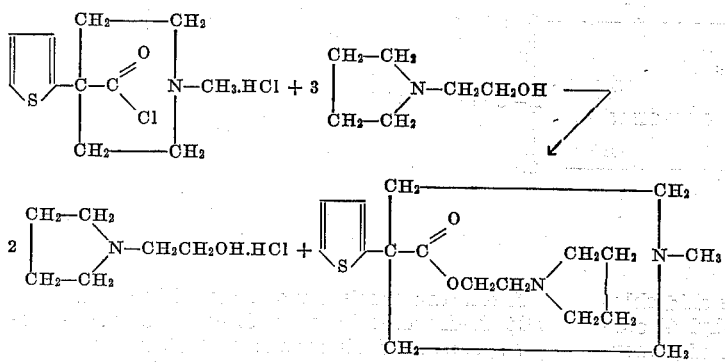

A mixture consisting of 15 g. of the acid chloride hydrochloride of 2-[4'-(1'-methyl-4'-carboxypiperidyl)] thiophene and 25 ml. of β-pyrrolidinoethanol is heated on a steam bath for two hours. The excess amino alcohol is removed by distillation under reduced pressure, the residue treated with 75 ml. of water and the mixture acidified with dilute hydrochloric acid. The solution is treated with charcoal, filtered and the filtrate treated with an excess of 5% sodium hydroxide solution. The ester is extracted with ether, the ether extracts dried over anhydrous magnesium sulfate, the drying agent removed by filtration and the ether distilled. The residue is fractionated under reduced pressure (about 5 mm. of mercury) to obtain the pure β-pyrrolidinoethyl ester of 2-[4'-(1'-methyl-4'-carboxypiperidyl)] thiophene.

5 g. of the pure ester is dissolved in 100 ml. of anhydrous ether and the resulting solution treated with an excess of dry gaseous hydrogen iodide. The precipitated dihydroiodide salt is collected, washed with ether and recrystallized from n-propyl alcohol-ether mixture.

*Example 4.—β-Piperidinoethyl ester of 2-[4'-(1'-methyl-4'-carboxypiperidyl)] thiophene* filtrate treated with an excess of 5% sodium hydroxide solution. The precipitated ester is extracted with ether, the ether extracts dried over anhydrous magnesium sulfate and the drying agent removed by filtration. The ether is distilled from the filtrate and the residue fractionally distilled under a pressure of about 5 mm. of mercury to obtain the pure β-piperidinoethyl ester of 2-[4'-(1'-methyl-4'-carboxypiperidyl)] thiophene.

10 g. of the pure ester is dissolved in 200 ml. of anhydrous ether and the resulting solution treated with a slight excess of dry hydrogen chloride. The white dihydrochloride salt which precipitates is collected, washed with ether and recrystallized from n-propanol-dry ether mixture.

5 g. of the pure ester is dissolved in a small amount of absolute ethanol and a solution containing an equivalent amount of maleic acid in absolute ethanol is added. The mixture is evaporated to dryness and the crude maleic acid salt of the ester purified by recrystallization from absolute ethanol-ether mixture.

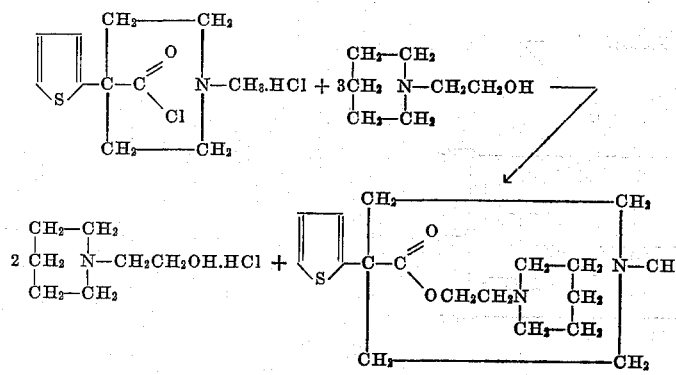

*Example 5:—β-Morpholinoethyl ester of 2-[4'-(1'-methyl-4'-carboxypiperidyl)] thiophene*

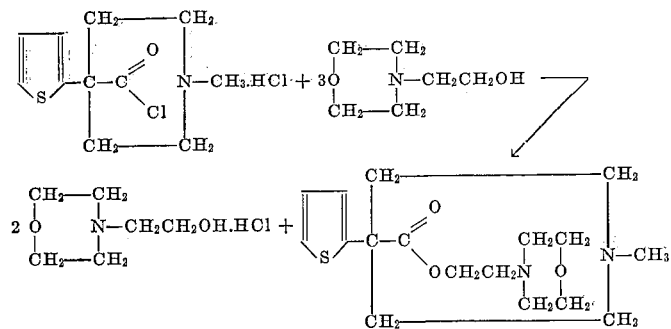

A mixture consisting of 15 g. of the acid chloride hydrochloride of 2-[4'-(1'-methyl-4'-carboxypiperidyl)] thiophene and 35 ml. of β-morpholinoethanol is heated on a steam bath for two hours and then the excess amino alcohol distilled off under reduced pressure. The dry residue is treated with 75 ml. of water, the mixture acidified with dilute hydrochloric acid, treated with charcoal and filtered. An excess of 5% sodium hydroxide solution is added to the filtrate and the precipitated ester extracted with ether. The ether extracts are dried over anhydrous magnesium sulfate, the drying agent removed by filtration and the ether distilled from the filtrate. The residue is fractionally distilled under about 5 mm. pressure to obtain the desired β-morpholinoethyl ester of 2-[4'-(1'-methyl-4'-carboxypiperidyl)] thiophene.

10 g. of the pure ester is dissolved in 200 ml. of anhydrous ether and the resulting solution treated with a slight excess of dry gaseous hydrogen chloride.

The white precipitated dihydrochloride salt of the β-morpholinoethyl ester of 2-[4'-(1'-methyl-4'-carboxypiperidyl)]-thiophene is removed by filtration, washed with dry ether and recrystalized from n-propanol-ether mixture.

*Example 6.—γ-Diethylaminopropyl ester of 2-[4' - (1'-methyl-4'-carboxypiperidyl)] thiophene*

A mixture consisting of 15 g. of the acid chloride hydrochloride of 2-[4'-(1'-methyl-4'-carboxypiperidyl)] thiophene and 35 ml. of γ-diethylaminopropanol is heated on a steam bath for three hours. The excess amino alcohol is distilled off under reduced pressure and the dry residue treated with 100 ml. of water. The mixture is acidified with dilute hydrochloric acid, treated with charcoal and filtered. The clear filtrate is made alkaline in the cold with 5% sodium hydroxide solution and the free base of the ester extracted with ether. The ether extracts are dried over magnesium sulfate, filtered and the ether distilled from the filtrate. The residual oil is distilled under diminished pressure to yield the desired γ-diethylaminopropyl ester of 2 - [4' - (1' - methyl-4'-carboxypiperidyl)] thiophene.

10 g. of the freshly distilled basic ester is dissolved in 200 ml. of anhydrous ether and the resulting solution treated with a slight excess of gaseous hydrogen bromide. The white dihydrobromide salt of the γ-diethylaminopropyl ester of 2 - [4' - (1' - methyl-4'-carboxypiperidyl)] thiophene which separates is collected, washed several times with dry ether and purified by recrystallization from n-propanol-dry ether mixture.

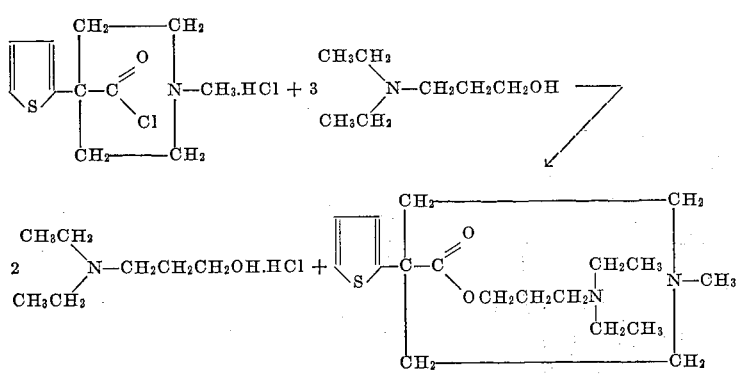

*Example 7.—γ-Piperidinopropyl ester of 2-[4'-(1'-methyl-4'-carboxypiperidyl)]-5-bromothiophene*

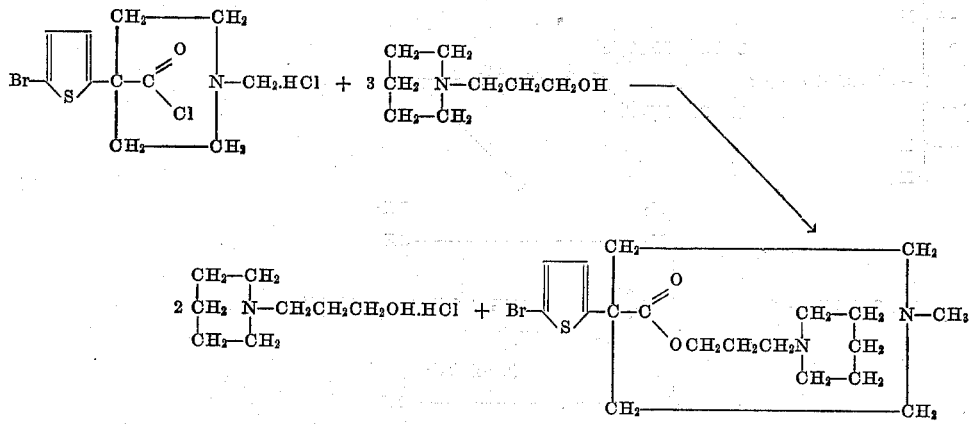

A mixture consisting of 15 g. of the hydrochloride salt of the acid chloride of 2-[4'-(1'-methyl-4'-carboxypiperidyl)]-5-bromothiophene (prepared, for example, as described in Example 6 of my co-pending application No. 609,335, filed August 6, 1945) and 35 ml. of γ-piperidinopropanol is heated on a steam bath for three hours. The excess amino alcohol is distilled off under reduced pressure and the dry residue treated with 100 ml. of water. The mixture is acidified with dilute hydrochloric acid, treated with charcoal and filtered. The filtrate is made alkaline in the cold with 5% sodium hydroxide solution and the ester base extracted with ether. The combined ether extracts are dried over magnesium sulfate, the drying agent removed by filtration and the ether distilled. The residue is heated under about 2 mm. pressure at 100° C. in an oil bath to remove any remaining γ-piperidinopropyl, cooled and the vacuum released. The residue consists of γ-piperidinopropyl ester of 2-[4'-(1'-methyl-4'-carboxypiperidyl)]-5-bromothiophene. The ester may be purified by recrystallization of the dihydrochloride salt. The residue is taken up in anhydrous ether and the resulting solution treated with a slight excess of dry hydrogen chloride. The white precipitated dihydrochloride salt is removed by filtration, washed with dry ether and recrystallized from n-propanol-dry ether mixture.

*Example 8.—δ-Diethylaminobutyl ester of 2-[4'-(1'-ethyl-4'-carboxypiperidyl)]-5-methylthiophene*

A mixture consisting of 15 g. of the hydrochloride salt of the acid chloride of 2-[4'-(1'-ethyl-4'-carboxypiperidyl)]-5-methylthiophene (prepared, for example, as described in Example 8 of my co-pending application, No. 609,335, filed August 6, 1945) and 35 ml. of δ-diethylaminobutanol is heated on a steam bath for three hours and then the excess amino alcohol distilled off under reduced pressure. The dry residue is treated with 100 ml. of water, the resulting mixture acidified with dilute hydrochloric acid, charcoaled and filtered. The clear aqueous filtrate is made alkaline in the cold with 5% sodium hydroxide solution and the free base of the ester extracted with ether. The combined ether extracts are dried over magnesium sulfate, the drying agent removed by filtration and the ether distilled from the filtrate. The residue is distilled under a pressure of about 1 mm. of mercury to obtain the pure δ-diethylaminobutyl ester of 2-[4'-(1'-ethyl-4'-carboxypiperidyl)]-5-methylthiophene.

10 g. of freshly distilled ester is dissolved in 200 ml. of dry ether and a slight excess of dry gaseous hydrogen iodide passed into the resulting solution. The white dihydriodide salt which separates is collected, washed with anhydrous ether and purified by recrystallization from n-propanol-dry ether mixture.

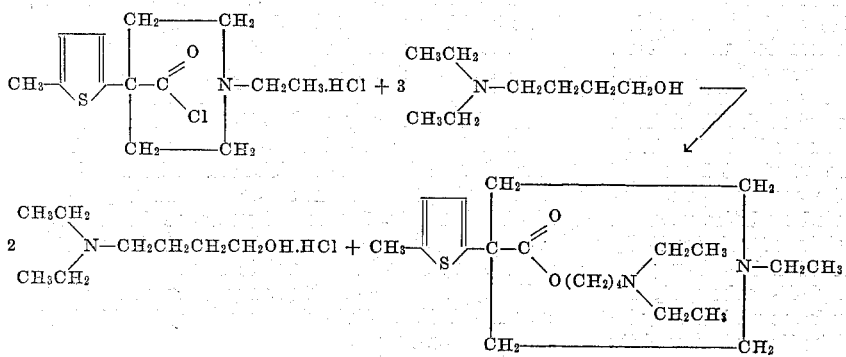

*Example 9.—β-Di-n-butylaminoethyl ester of 2-[4'-(1'-n-propyl-2', 3', 5', 6'-tetramethyl-4'-carboxypiperidyl)] - 4 - methyl - 5 - chlorothiophene*

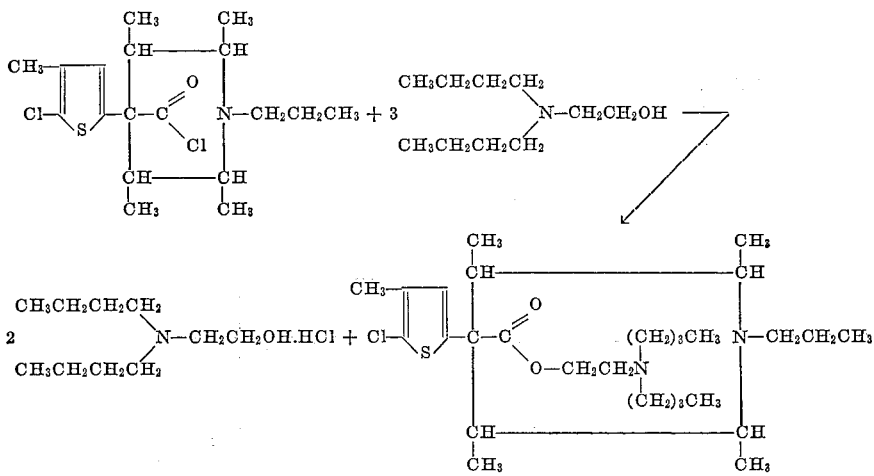

A mixture consisting of 15 g. of the acid chloride hydrochloride of 2-[4'-(1'-n-propyl-2', 3', 5', 6' - tetramethyl - 4' - carboxypiperidyl)] - 4-methyl-5-chlorothiophene hydrochloride (prepared, for example, as described in Example 12 of my co-pending application No. 609,335, filed August 6, 1945) and 35 ml. of β-di-n-butylaminoethanol is heated on a steam bath for three hours and then the excess amino alcohol removed by distillation under reduced pressure. The dry residue is treated with 100 ml. of water, the mixture acidified with dilute hydrochloric acid, charcoaled and filtered. The clear filtrate is made alkaline in the cold with 5% sodium hydroxide and the precipitated ester extracted with ether. The combined ether extracts are dried over anhydrous magnesium sulfate, the drying agent removed by filtration and the ether distilled from the filtrate. The residue is heated at 100° C. in an oil bath under a pressure of about 1 mm. of mercury to remove any of the amino alcohol remaining in the product, cooled and the vacuum released. The residue consists of substantially pure β-di-n-butylethyl ester of 2-[4'-(1'-n-propyl-2', 3', 5', 6'-tetramethyl-4'-carboxypiperidyl)]-4-methyl-5-chlorothiophene which may be purified further by recrystallization of one of its acid addition salts such as the dihydrochloride, dihydrobromide and the like.

*Example 10. — δ - Diethylamino - α - methylbutyl ester of 2-[4'-(1'-isopropyl-3', 5'-diethyl-4'-carboxy-piperidyl)]-5-t-butylthiophene*

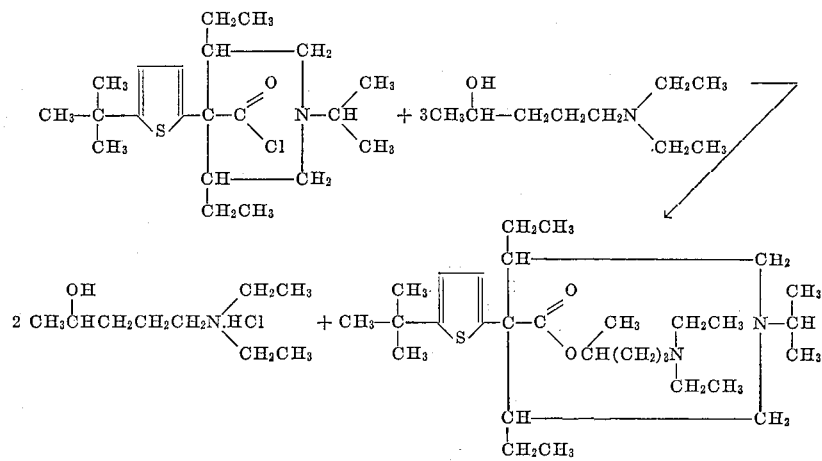

A mixture consisting of 20 g. of the hydrochloride salt of the acid chloride of 2-[4'-(1'-isopropyl-3', 5'-diethyl-4'-carboxypiperidyl)]-5-t-butylthiophene (prepared, for example, as described in Example 13 of my co-pending application No. 609,335, filed August 6, 1945) and 35 ml. of 1-diethylamino-4-pentanol is heated on a steam bath for three hours and then the excess amino alcohol is distilled off under reduced pressure. The residue is taken up in 100 ml. of water, the mixture acidified with dilute hydrochloric acid, charcoaled and filtered. The clear filtrate is made alkaline with 5% sodium hydroxide solution and the ester extracted with ether. The combined ether extracts are dried over magnesium sulfate, filtered and the ether distilled. The residue is heated at 100° C. in an oil bath under a pressure of about 0.5 to 1 mm. of pressure in order to remove any remaining amino alcohol and then cooled. The residue consists of practically pure δ-diethyl-amino-α-methylbutyl ester of 2-[4'-(1'-iso-propyl-3', 5'-diethyl-4'-carboxypiperidyl)]-5-t-butylthiophene.

*Example 11.—ϵ-Diethylaminopentyl ester of 2-[4'-(1'-n-amyl-3'-methyl-4'-carboxy-5'-n-butylpiperidyl)]-5-iodothiophene*

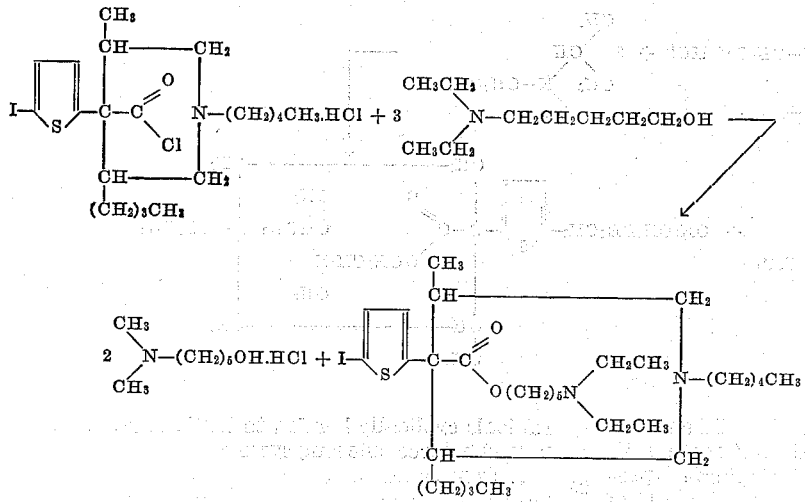

A mixture consisting of 15 g. of the hydrochloride of the acid chloride of 2-[4'-(1'-n-amyl-3'-methyl-4'-carboxy-5'-n-butylpiperidyl)]-5-iodothiophene (prepared, for example, as described in my co-pending application No. 609,335, filed August 6, 1945), and 30 ml. of ϵ-diethylaminopentanol-1 is heated on a steam bath for four hours. The excess amino alcohol is removed by distillation in vacuo and the residue treated with 100 ml. of water. The mixture is acidified with dilute hydrochloric acid, charcoaled, filtered and the filtrate made alkaline in the cold with 5% sodium hydroxide solution. The ester is extracted with ether, the ether extracts dried over magnesium sulfate and the drying agent removed by filtration. The ether is distilled and the residue heated for a short time at 100° C. in an oil bath under a pressure of about 0.5 to 1 mm. to remove any remaining amino alcohol. The residue is cooled, taken up in ether, charcoaled and the solution filtered. The free base of the ϵ-diethylaminopentyl ester of 2-[4'-(1'-n-amyl-3'-methyl-4'-carboxy-5'-n-butylpiperidyl)]-5-iodothiophene may be obtained by evaporation of the ether or the ester may be isolated as its dihydrochloride salt by treating the ether solution of the base with a slight excess of dry gaseous hydrogen chloride.

*Example 12.—β-Methylethylaminoethyl ester of 2-[4'-(1'-methyl-4'-carboxypiperidyl)]-4,5-dimethylthiophene*

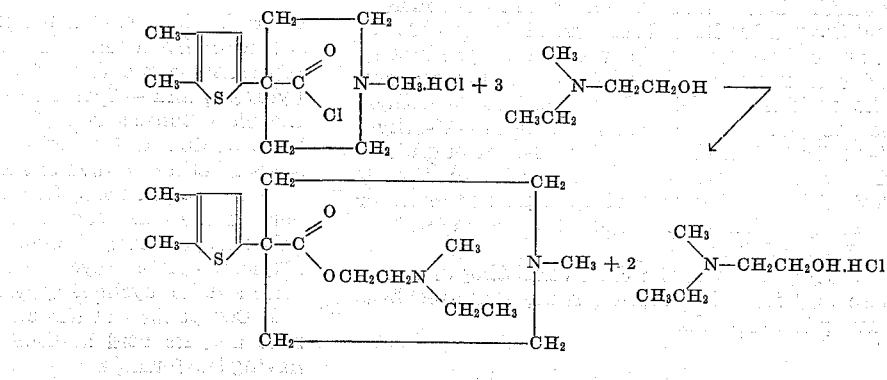

A mixture consisting of 20 g. of the hydrochloride salt of the acid chloride of 2-[4'-(1'-methyl-4'-carboxypiperidyl)]-4,5-dimethylthiophene (prepared, for example, as described in Example 7 of my co-pending application No. 609,335, filed August 6, 1945), and 35 ml. of β-methylethylaminoethanol is heated on a steam bath for three hours. The excess amino alcohol is removed by distillation in vacuo and the dry residue treated with 100 ml. of water. The mixture is acidified with dilute hydrochloric acid, treated with charcoal and filtered. The clear filtrate is made alkaline in the cold with 5% sodium hydroxide solution and the free ester extracted with ether. The combined ether extracts are dried over anhydrous magnesium sulfate, filtered and the ether distilled. The residue is distilled under reduced pressure to obtain the pure β-methylethylaminoethyl ester of 2-[4'-(1'-methyl-4'-carboxypiperidyl)]-4,5-dimethylthiophene.

*Example 13.—β-Methyl-iso-propylaminoethyl ester of 2-[4'-(1'-ethyl-3'-methyl-4'-carboxypiperidyl)]-5-n-butylthiophene*

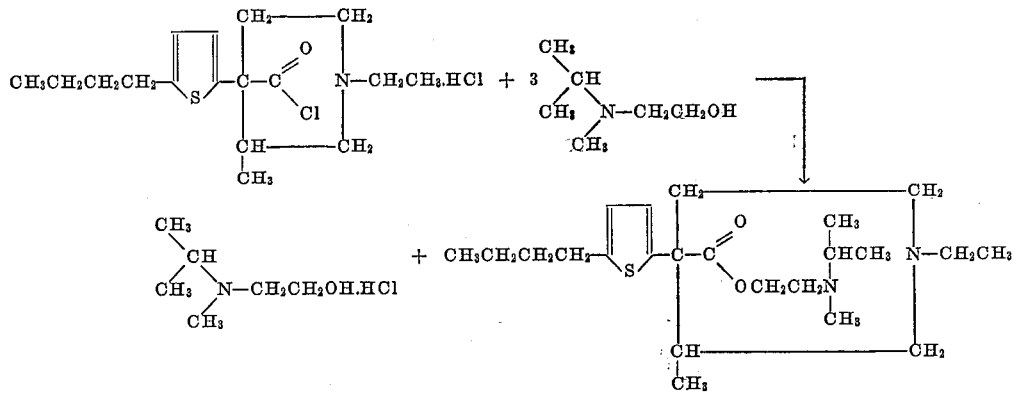

A mixture consisting of 15 g. of the acid chloride hydrochloride of 2-[4'-(1'-ethyl-3'-methyl-4'-carboxypiperidyl)]-5-n-butylthiophene (prepared, for example, as described in Example 11 of my co-pending application No. 609,335, filed August 6, 1945), and 30 ml. of β-methyl-iso-propyl-aminoethanol is heated on a steam bath for three hours and then the excess amino alcohol removed by distillation under reduced pressure. The residue is treated with 100 ml. of water and the mixture acidified with dilute hydrochloric acid. The solution is treated with charcoal, filtered and the filtrate made alkaline with 5% sodium hydroxide solution. The ester is extracted with ether, the ether extracts dried over magnesium sulfate and filtered. The ether is evaporated from the filtrate and the residue heated for a short time at 100° C. in an oil bath under about 1 mm. of pressure in order to remove any remaining amino alcohol. The residue consists of the desired β-methyl-iso-propylaminoethyl ester of 2-[4'-(1'-ethyl-3'-methyl-4'-carboxypiperidyl)]-5-n-butylthiophene. The product may be purified further if desired by distillation under reduced pressure or by recrystallization of its dihydrochloride salt.

What I claim is:

1. Compounds of the class consisting of a free base and its acid addition salts, said free base having the formula,

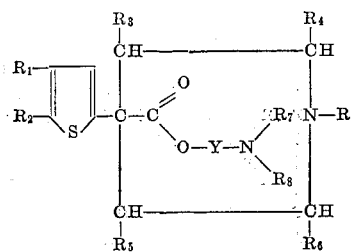

where R represents a member of the class consisting of hydrogen and lower alkyl radicals, $R_1$ represents a member of the class consisting of hydrogen and —$CH_3$, $R_2$ represents a member of the class consisting of hydrogen, chlorine, bromine, iodine, and lower alkyl radicals, $R_3$, $R_4$, $R_5$, and $R_6$ represent members of the class consisting of hydrogen and lower alkyl radicals, Y represents a saturated divalent hydrocarbon radical of 2 to 6 carbon atoms, $R_7$ and $R_8$ represent members of the class consisting of lower alkyl radicals independently bonded to the N and lower alkylene radicals cyclically bonded to the N to form a saturated heterocyclic ring system.

2. Compounds of the class consisting of a free base and its acid addition salts, said free base having the formula,

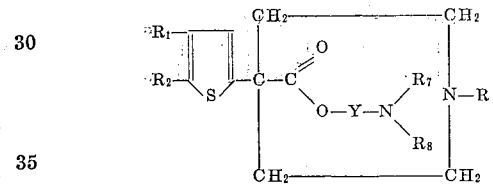

where R represents a member of the class consisting of hydrogen and lower alkyl radicals, $R_1$ represents a member of the class consisting of hydrogen and —$CH_3$, $R_2$ represents a member of the class consisting of hydrogen, chlorine, bromine, iodine and lower alkyl radicals, Y represents a saturated divalent hydrocarbon radical of 2 to 6 carbon atoms, $R_7$ and $R_8$ represent members of the class consisting of lower alkyl radicals independently bonded to the N and lower alkylene radicals cyclically bonded to the N to form a heterocyclic ring system.

3. Compounds of the class consisting of a free base and its acid addition salts, said free base having the formula,

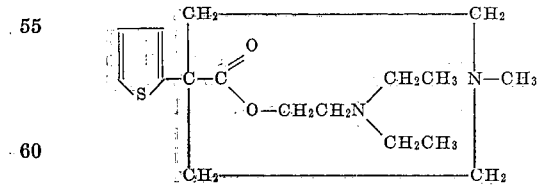

4. Compounds of the class consisting of a free base and its acid addition salts, said free base having the formula,

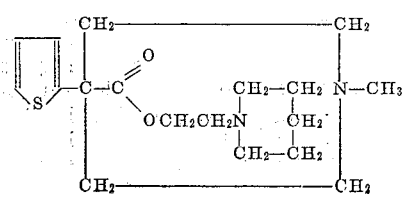

5. Compounds of the class consisting of a free base and its acid addition salts, said free base having the formula,

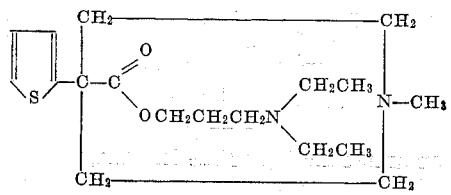

6. A compound of the formula,

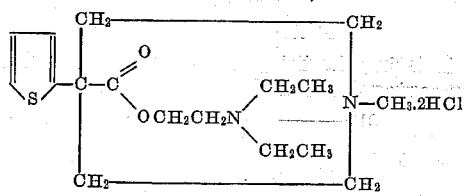

7. A compound of the formula,

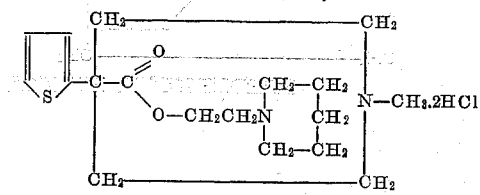

8. A compound of the formula,

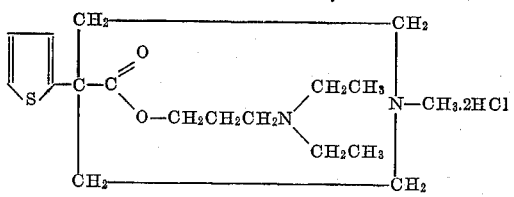

9. Process which comprises treating the hydrochloride salt of a thiophenic acyl chloride of the formula,

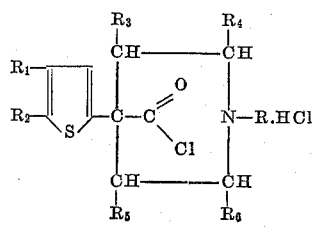

with an amino alcohol of the formula

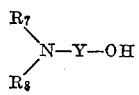

and isolating the thiophenic ester so formed, said ester having the formula

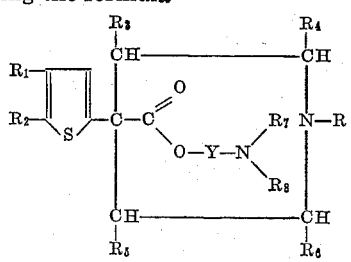

where R represents a member of the class consisting of hydrogen and lower alkyl radicals, $R_1$ represents a member of the class consisting of hydrogen and $-CH_3$, $R_2$ represents a member of the class consisting of hydrogen, chlorine, bromine, iodine and lower alkyl radicals, $R_3$, $R_4$, $R_5$ and $R_6$ represent members of the class consisting of hydrogen and lower alkyl radicals, Y represents a saturated divalent hydrocarbon radical of 2 to 6 carbon atoms, $R_7$ and $R_8$ represent members of the class consisting of lower alkyl radicals independently bonded to the N and lower alkylene radicals cyclically bonded to the N to form a saturated heterocyclic ring system.

10. Process which comprises treating the hydrochloride salt of a thiophenic acyl chloride of the formula,

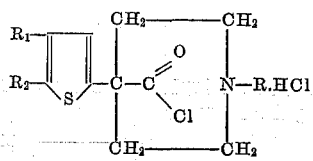

with an amino alcohol of the formula,

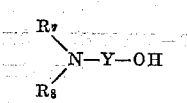

and isolating the thiophenic ester so formed, said ester having the formula,

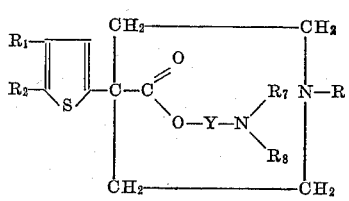

where R represents a member of the class consisting of hydrogen and lower alkyl radicals, $R_1$ represents a member of the class consisting of hydrogen and $-CH_3$, $R_2$ represents a member of the class hydrogen, chlorine, bromine, iodine and lower alkyl radicals, Y represents a saturated divalent hydrocarbon radical of 2 to 6 carbon atoms, $R_7$ and $R_8$ represent members of the class consisting of lower alkyl radicals independently bonded to the N and lower alkylene radicals cyclically bonded to the N to form a saturated heterocyclic ring system.

11. Process which comprises treating the hydrochloride salt of a thiophenic acyl chloride of the formula, with an amino alcohol of the formula, $$CH_3CH_2 \diagdown N-CH_2CH_2OH \diagup CH_3CH_2$$

and isolating the thiophenic ester so formed, said ester having the formula,

12. Process which comprises treating the hydrochloride salt of a thiophenic acyl chloride of the formula,

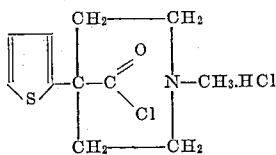

with an amino alcohol of the formula,

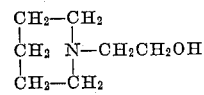

and isolating the thiophenic ester so formed, said ester having the formula

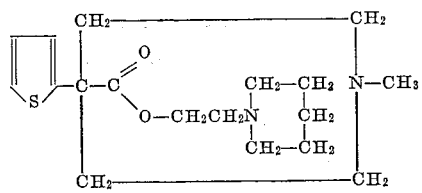

13. Process which comprises treating the hydrochloride salt of a thiophenic acyl chloride of the formula,

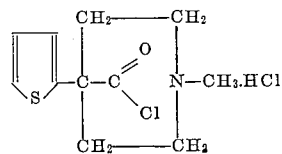

with an amino alcohol of the formula,

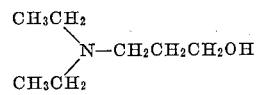

and isolating the thiophenic ester so formed, said ester having the formula,

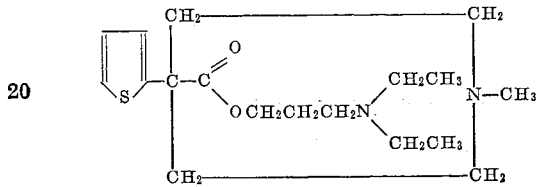

FREDERICK F. BLICKE.